(12) United States Patent
Swenson et al.

(10) Patent No.: US 11,614,354 B2
(45) Date of Patent: Mar. 28, 2023

(54) DIPSTICK AND ELECTRONIC FLUID LEVEL SENSOR

(71) Applicant: Renk America LLC, Muskegon, MI (US)

(72) Inventors: David Carl Swenson, Spring Lake, MI (US); Timothy Ryan Klein, Muskegon, MI (US); John Wesley Clark, Montague, MI (US); Michael Jay Strait, Muskegon, MI (US)

(73) Assignee: Renk America LLC, Muskegon, MI (US)

( * ) Notice: Subject to any disclaimer, the term of this patent is extended or adjusted under 35 U.S.C. 154(b) by 0 days.

(21) Appl. No.: 16/328,420

(22) PCT Filed: Feb. 13, 2019

(86) PCT No.: PCT/US2019/017892
§ 371 (c)(1),
(2) Date: May 13, 2020

(87) PCT Pub. No.: WO2019/160987
PCT Pub. Date: Aug. 22, 2019

(65) Prior Publication Data
US 2021/0223086 A1    Jul. 22, 2021

Related U.S. Application Data

(60) Provisional application No. 62/629,873, filed on Feb. 13, 2018.

(51) Int. Cl.
*G01F 23/04* (2006.01)
*F01M 11/12* (2006.01)
*G01F 23/263* (2022.01)

(52) U.S. Cl.
CPC ............ *G01F 23/04* (2013.01); *F01M 11/12* (2013.01); *G01F 23/263* (2013.01)

(58) Field of Classification Search
CPC ........ G01F 23/04; G01F 23/263; F01M 11/12
See application file for complete search history.

(56) References Cited

U.S. PATENT DOCUMENTS 4,296,472 A    10/1981  Sarkis
4,322,713 A     3/1982  Duck et al.
(Continued)

FOREIGN PATENT DOCUMENTS

CN     107110691 A    8/2017
DE       4230598 A1    3/1994
(Continued)

OTHER PUBLICATIONS

Espacenet English language abstract for DE 4230598 A1, Mar. 17, 1994.
(Continued)

*Primary Examiner* — Natalie Huls
(74) *Attorney, Agent, or Firm* — Donald J. Lecher; Butzel Long

(57) ABSTRACT

A system, as an engine with a crankcase containing oil or a fluid mixed with oil, has a reservoir containing liquid that extends up to a level of the fluid. A dipstick support structure supports a dipstick on it so that the dipstick extends into the fluid past the level of the fluid, and so that the dipstick is manually removable from the dipstick support structure by a user. An electrical system is connected with the dipstick, and the electrical system electrically senses the level of the fluid based on an electrical characteristic of the dipstick that varies with the varying level of the fluid when the dipstick extends into it. The electrical characteristic may be capacitance of the dipstick detected by sequential charging and (Continued)

discharging of the dipstick to produce a square wave electrical signal the frequency of which corresponds to the level of fluid.

22 Claims, 14 Drawing Sheets

(56) References Cited

U.S. PATENT DOCUMENTS

| | | | |
|---|---|---|---|
| 4,506,258 A | 3/1985 | Charboneau et al. | |
| 5,205,172 A | 4/1993 | Doak | |
| 5,299,456 A * | 4/1994 | Steiner | G01F 23/04 |
| | | | 123/196 S |
| 5,461,321 A | 10/1995 | Sanders et al. | |
| 6,377,052 B1 * | 4/2002 | McGinnis | G01N 27/02 |
| | | | 324/439 |
| 7,284,427 B2 | 10/2007 | Calabrese | |
| 7,475,665 B2 | 1/2009 | Ketelhohn et al. | |
| 10,578,477 B2 | 3/2020 | Rondano et al. | |
| 2003/0233875 A1 | 12/2003 | Stehman et al. | |
| 2004/0149032 A1 * | 8/2004 | Sell | G01F 23/268 |
| | | | 73/304 C |
| 2010/0315246 A1 | 12/2010 | Gilpatrick | |
| 2011/0060551 A1 * | 3/2011 | Elhajj | G01B 11/0625 |
| | | | 702/166 |
| 2012/0260729 A1 * | 10/2012 | Bayley | G01F 23/363 |
| | | | 73/305 |
| 2013/0068015 A1 | 3/2013 | Sinha | |
| 2013/0261539 A1 * | 10/2013 | King | G01F 23/265 |
| | | | 604/65 |
| 2014/0318236 A1 | 10/2014 | Lingle et al. | |
| 2016/0288994 A1 | 10/2016 | Lorenzen | |
| 2017/0199070 A1 | 7/2017 | Bayerl | |
| 2017/0299416 A1 | 10/2017 | Randano et al. | |
| 2018/0045549 A1 * | 2/2018 | Soucie | G01F 23/24 |

FOREIGN PATENT DOCUMENTS

| | | | | |
|---|---|---|---|---|
| DE | 10154072 A1 * | 5/2003 | | G01F 23/04 |
| DE | 10163881 A1 * | 7/2003 | | F01M 11/12 |
| DE | 10235949 A1 | 3/2004 | | |
| DE | 102006050661 A1 * | 4/2008 | | G01F 23/263 |
| EP | 2112481 A1 * | 10/2009 | | G01F 23/04 |
| EP | 3051260 A1 | 3/2016 | | |
| FR | 2906364 A1 | 3/2008 | | |
| FR | 2936313 A1 | 3/2010 | | |
| JP | H09-21677 A | 1/1997 | | |
| WO | 2015/022652 A1 | 2/2015 | | |
| WO | 2016/042456 A2 | 3/2016 | | |

OTHER PUBLICATIONS

Espacenet English language abstract for DE 10235949 A1, Mar. 11, 2004.
Espacenet English language abstract for Jp H09-21677 A, Jan. 21, 1997.
Espacenet English-language Abstract for FR 2 936 313 A1, Mar. 26, 2010.
Espacenet English-language Abstract for FR 2 906 364 (A1), Mar. 28, 2008.
Supplementary European Search Report for App. No. EP19754275.6, dated Oct. 22, 2021, 10 pages.

* cited by examiner

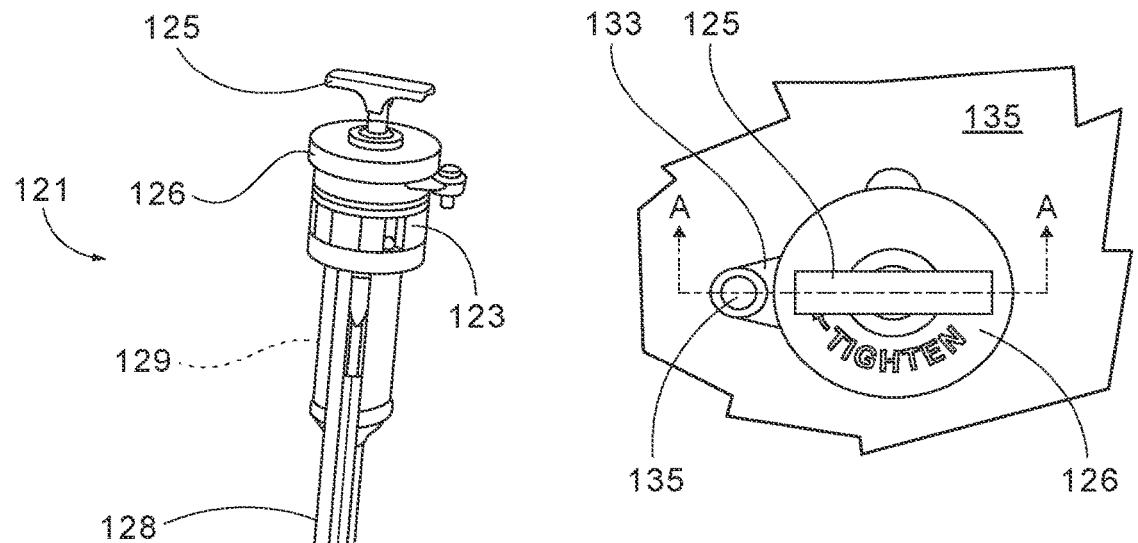
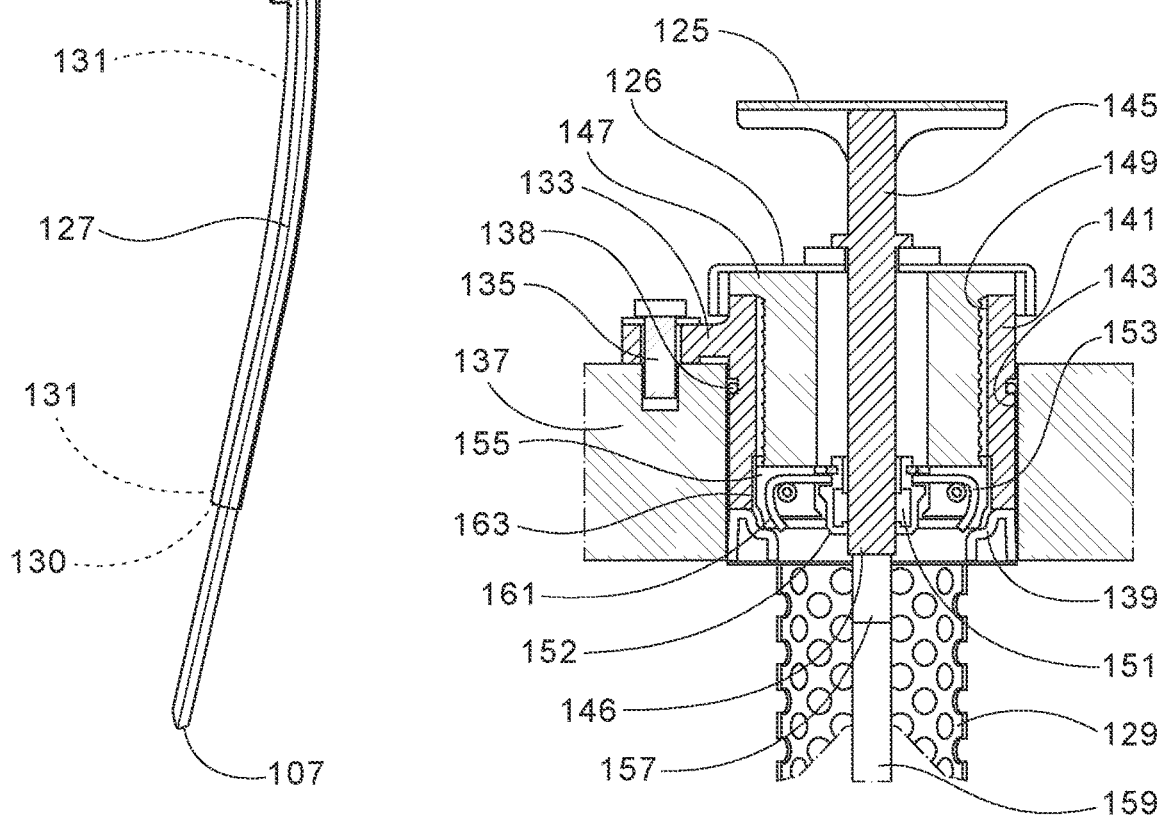
FIG. 11
FIG. 12
FIG. 13

US 11,614,354 B2

DIPSTICK AND ELECTRONIC FLUID LEVEL SENSOR

RELATED APPLICATIONS

This application claims the benefit of U.S. provisional application Ser. No. 62/629,873 filed on Feb. 13, 2018, which is herein incorporated by reference.

FIELD OF THE INVENTION

This invention relates to systems for determining the depth of fluid in a reservoir, and more particularly to determining the depth of fluid using a dipstick and an electronic sensing system. It is particularly applicable to systems for electronically monitoring the depth of oil in the crankcase of an engine where a dipstick is also provided for manual checking of the depth of the fluid.

BACKGROUND OF THE INVENTION

In the context of engines, especially engines for vehicles such as tanks or automobiles, it is well known to provide a dipstick for checking the level of oil present in the engine crankcase using a dipstick that is secured extending into the crankcase. The level is checked by cleaning the dipstick and inserting it into a passage in the crankcase and then withdrawing it. The oil level of the engine may be immediately determined by looking at the height of oil clingage to the dipstick, which may have markings to indicate the amount of oil associated with the depth of oil.

Systems of that sort require a person to access the dipstick and remove it from the engine and look at it, which may be difficult in various situations.

It is also known to provide sensors that detect the level of oil in an engine and transmit signals indicative of that level. These systems generally require mounting of a sensor in the engine, and it is a complex operation to provide such an electronic system in an engine that is not designed to accommodate the sensor system.

SUMMARY OF THE INVENTION

It is accordingly an object of the invention to provide an electronic fluid level detection system that overcomes the drawbacks of the prior art.

According to an aspect of the invention, a system comprises a reservoir containing liquid that extends up to a level of the fluid, and a dipstick support structure supporting a dipstick on it so that the dipstick extends into the fluid past the level of the fluid, and so that the dipstick is manually removable from the dipstick support structure by a user. An electrical system is connected with the dipstick, and the electrical system electrically senses the level of the fluid based on an electrical characteristic of the dipstick that varies with the varying level of the fluid when the dipstick extends therein.

According to another aspect of the invention, the reservoir is an engine crankcase containing oil or a fluid mixed with oil, the level of which is detected using a dipstick configured for use in an electronic fluid-level sensor system.

According to another aspect of the invention, a method is provided for sensing liquid in a reservoir, especially oil in an engine crankcase. The method comprises providing a dipstick removably supported so as to extend into the reservoir and into the liquid in an installed position. The dipstick has markings on it that indicate the level of the fluid on visual inspection by a user when the dipstick is removed from the reservoir. An electrical property of the dipstick is electrically detected when the dipstick is placed in the reservoir in the installed position so as to produce an electrical output indicative of the level of the fluid. A comparison of the level of the fluid to a predetermined level is performed electrically, and an alert is output to the user responsive to the comparison indicating that the level of the fluid is below the predetermined level.

According to an aspect of the invention, the method detects capacitance of the dipstick relative to the reservoir. The detecting of the capacitance comprises repeatedly applying an electrical current to the dipstick until the dipstick is charged, and then cutting the electrical current to the dipstick until the dipstick discharges. This is used to generate an output signal from the repeated charging and discharging that is a waveform with a frequency that is correlated to the level of fluid into which the dipstick extends in the installed position.

According to another aspect of the invention, a method is provided for retrofitting an engine with an electronic liquid or oil level sensor.

According to another aspect of the invention, changing capacitance is used to measure a fluid level based on frequency as an output from the sensor circuit in which a manual dipstick with minor modifications is part of the capacitive fluid level sensing circuit for both remote and manual level checking.

Other objects and advantages of the invention will become apparent from this specification.

BRIEF DESCRIPTION OF THE DRAWINGS

FIG. 11 is a perspective view of Another embodiment of dipstick sensing system according to the invention.

FIG. 12 is a top view of the dipstick sensing system of FIG. 11.

FIG. 13 is a detail cross-sectional view along line A-A of FIG. 12.

DETAILED DESCRIPTION

The present invention combines the utility of checking liquid levels using a traditional dipstick with the modern convenience of an electronic reporting sensor. The combination of the methods provides redundant operation in case of electronic failure and a traditional method of checking fluid levels for maintainers of the equipment.

Figure 8:
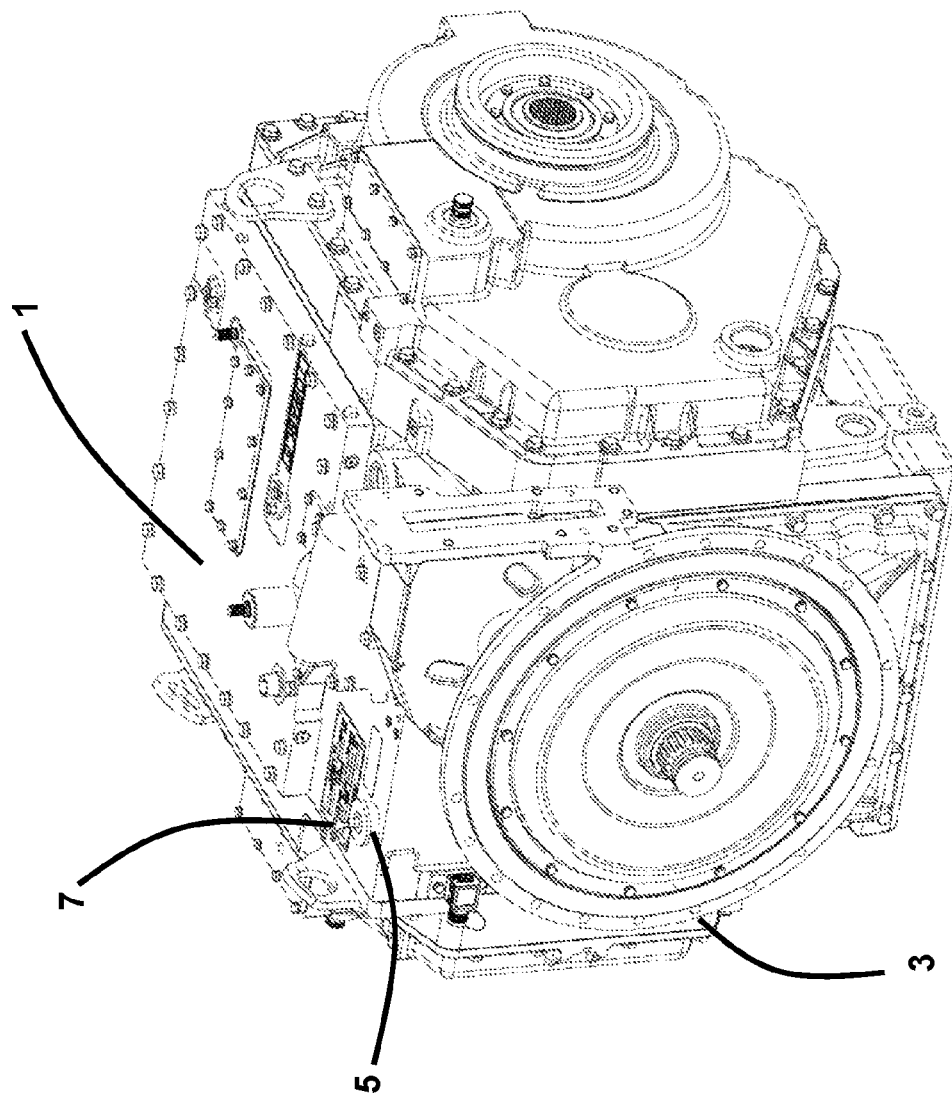
FIG. 8 is a view of a transmission having a dipstick that may be replaced with the dipstick of the invention herein.

FIG. 8 shows a transmission 1 used for a vehicle, comprising a block with a crankcase sump 3 that is filled with lubricating liquid, usually real or synthetic oil. An access structure 5 supports a dipstick structure 7 in it that can be removed, and clingage of oil to the dipstick can be viewed to see the level of oil in the crankcase sump 3. The access structure 5 is an opening that, in some cases, also is configured to be an opening for pouring oil into the crankcase sump 3.

Figure 1:
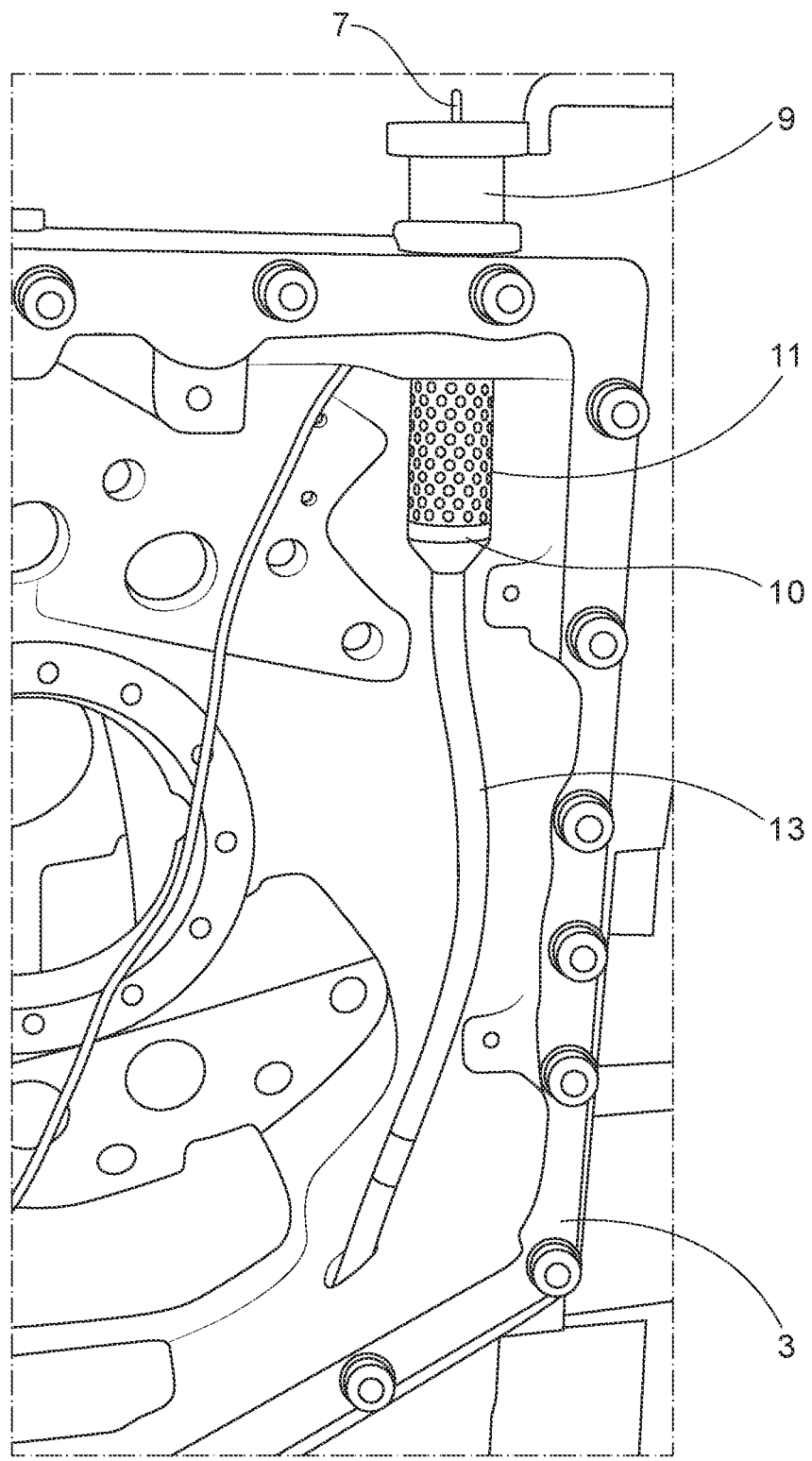
FIG. 1 is a photograph of an open crankcase showing the dipstick supporting interior assembly and a prototype of electronic sensing dipstick according to the invention.

As best seen in FIG. 1, inside the crankcase sump 3, the dipstick 7 according to the invention is supported by structure that has an access structure 9 extending through the housing wall from the exterior where it meets an enlarged perforated tube 11 that at its lower end 10 is connected with an elongated dipstick guide housing tube 13 that extends generally to the bottom of the crankcase sump 3. The guide housing tube 13 is open at both ends so it fills up with oil or whatever liquid in the reservoir to the same level as outside of the guide housing tube 13. Liquids are allowed to pass through the upper and lower housings or tubes 11 and 13 to the sump, allowing the maintenance personnel to add fluid at any time by removing the dipstick assembly. The holes in the perforated tube 11 allow for oil to be added to the crankcase sump 3 through tube 11.

Figure 2:
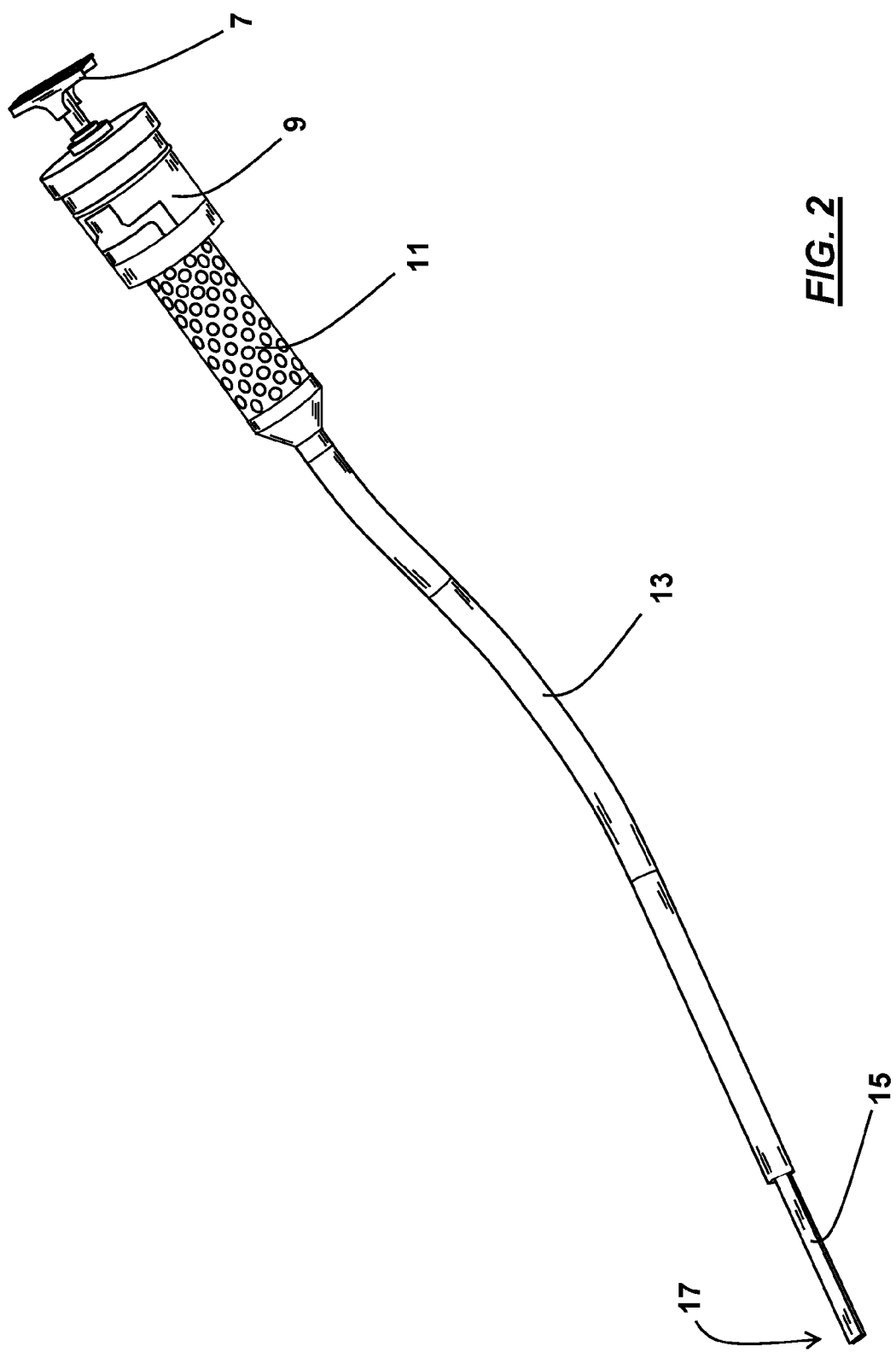
FIG. 2 is a perspective view of a dipstick support structure and a preferred embodiment of a sensor dipstick of the invention.

Referring to FIG. 2, a dipstick 15 is fixedly attached to the outer dipstick handle 7, which is removably sealed into the access structure 9 so as to seal off the access when secured in place. The dipstick extends from the handle 7 through the dipstick receiving structure, i.e., tubes 11 and 13 to a distal end 17.

Figure 2A:
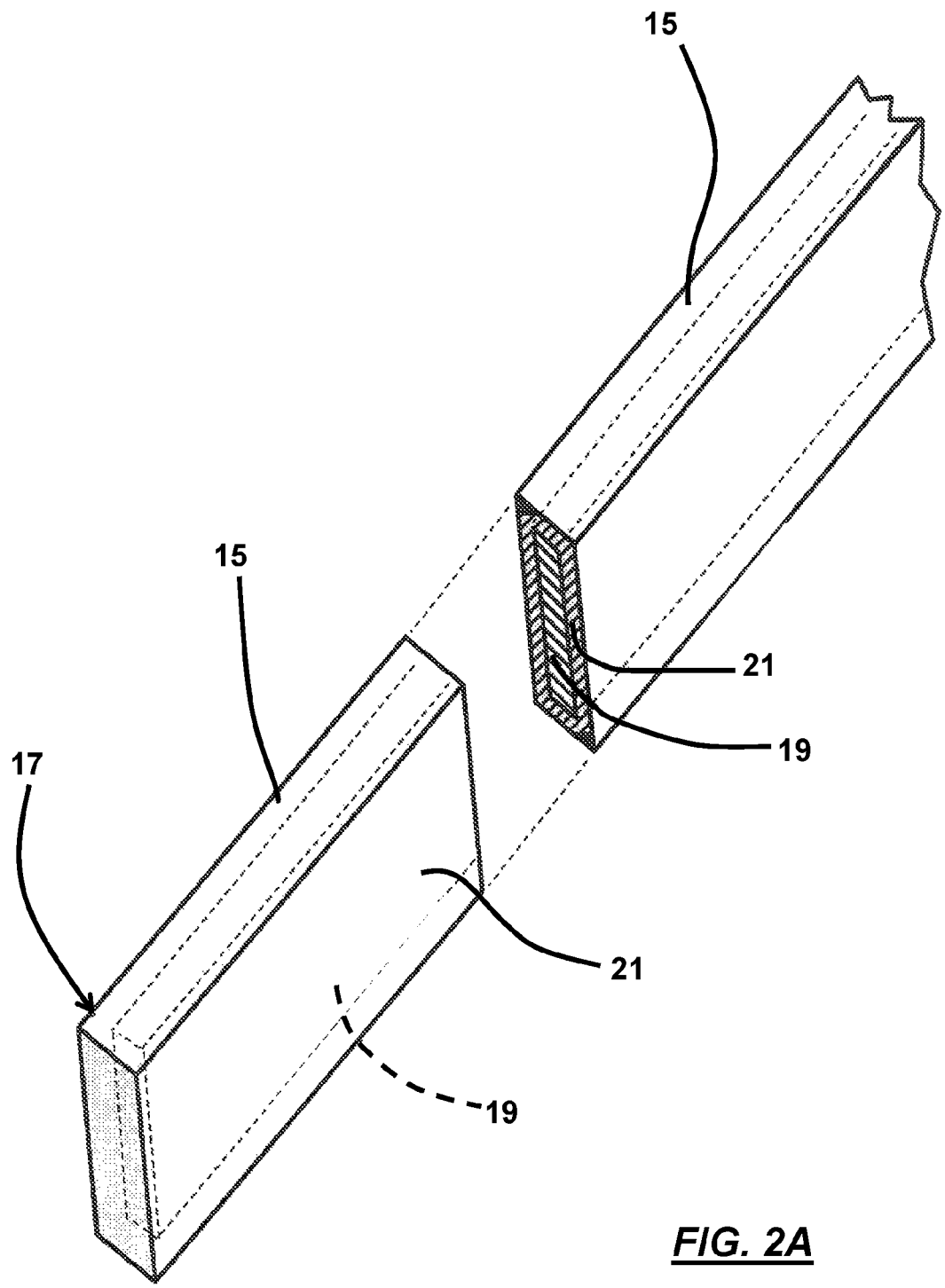
FIG. 2A is a partially cut away perspective detail view of a dipstick of the invention.

Referring to FIG. 2A, the dipstick 15 is a flat ribbon-like structure comprising a metal interior 19 surrounded by an outer layer 21 of electrically-nonconductive material. The interior metal is any sort of conductive metal or other conductive material that is adequately rigid to perform the function of a dipstick, e.g., stainless steel. The outer layer or coating 21 is preferably of an electrically non-conductive plastic polymer material that is durable and heat resistant, such as polyimide material, with a thickness sufficient to prevent flow of electrical power at a working voltage of the dipstick sensor, e.g., 5 volts.

The dipstick 15 functions in traditional manner, in that it may be removed, and a level of fluid in the sump may be checked by a user visually examining the clingage to the outer surface of the dipstick, which may be provided with markings at locations along the length of the dipstick where it contacts fluid when inserted into the housing to show amounts of liquid corresponding to the level of clingage on the dipstick.

The dipstick 15 also functions as one side of capacitive sensor pair. The polymer coating 21 prevents the metal or steel interior 19 of the dipstick from touching the guide housing tube 13 along its curved path. As the oil level inside the sump changes over time, the capacitance between the dipstick steel or metal core 19 and the guide housing tube 13 changes as well. The guide housing tube 13 reduces measured oil error due to foaming.

Figure 3:
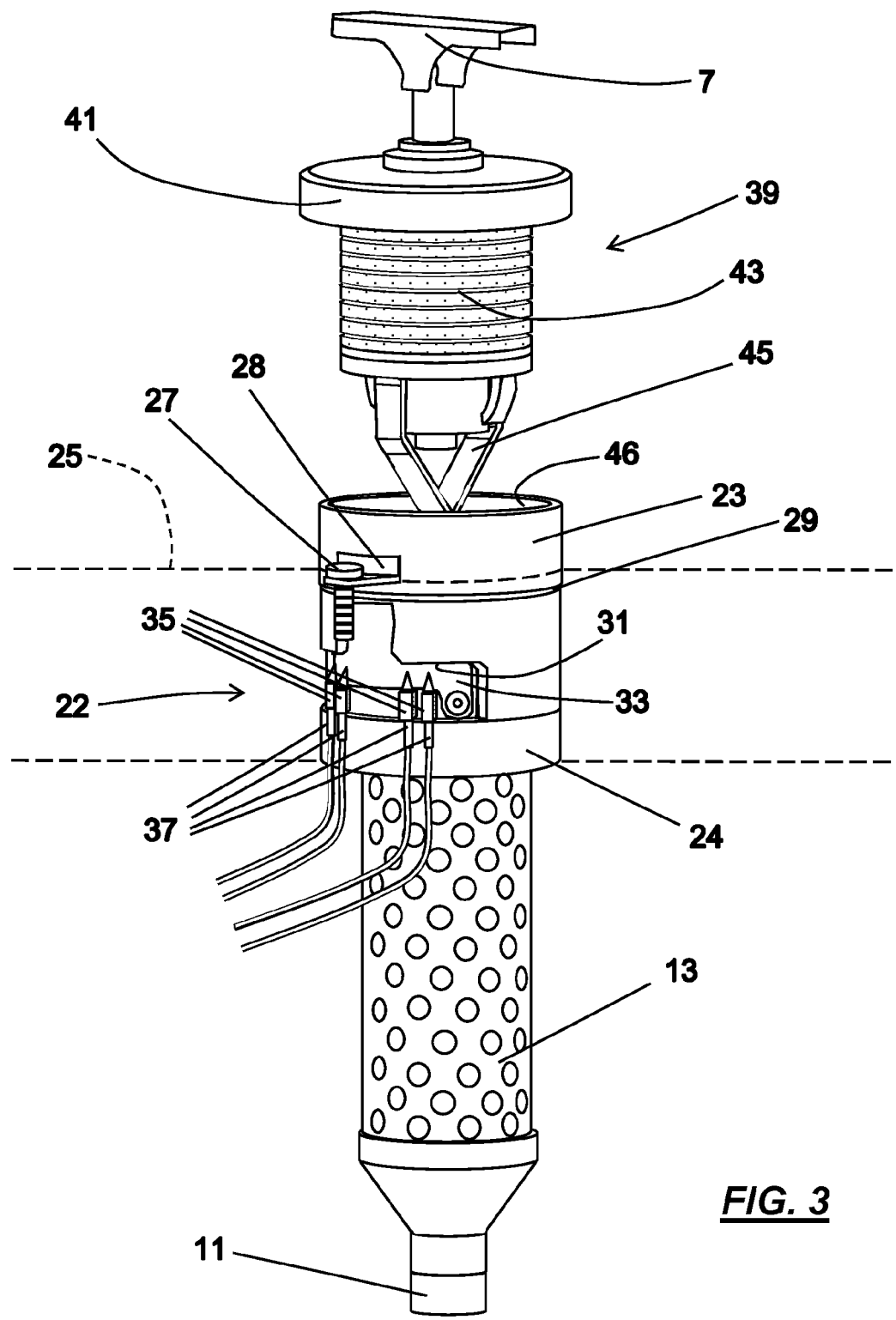
FIG. 3 is a partially exploded detail view of the end of the dipstick structure of FIG. 2.
Figure 5:
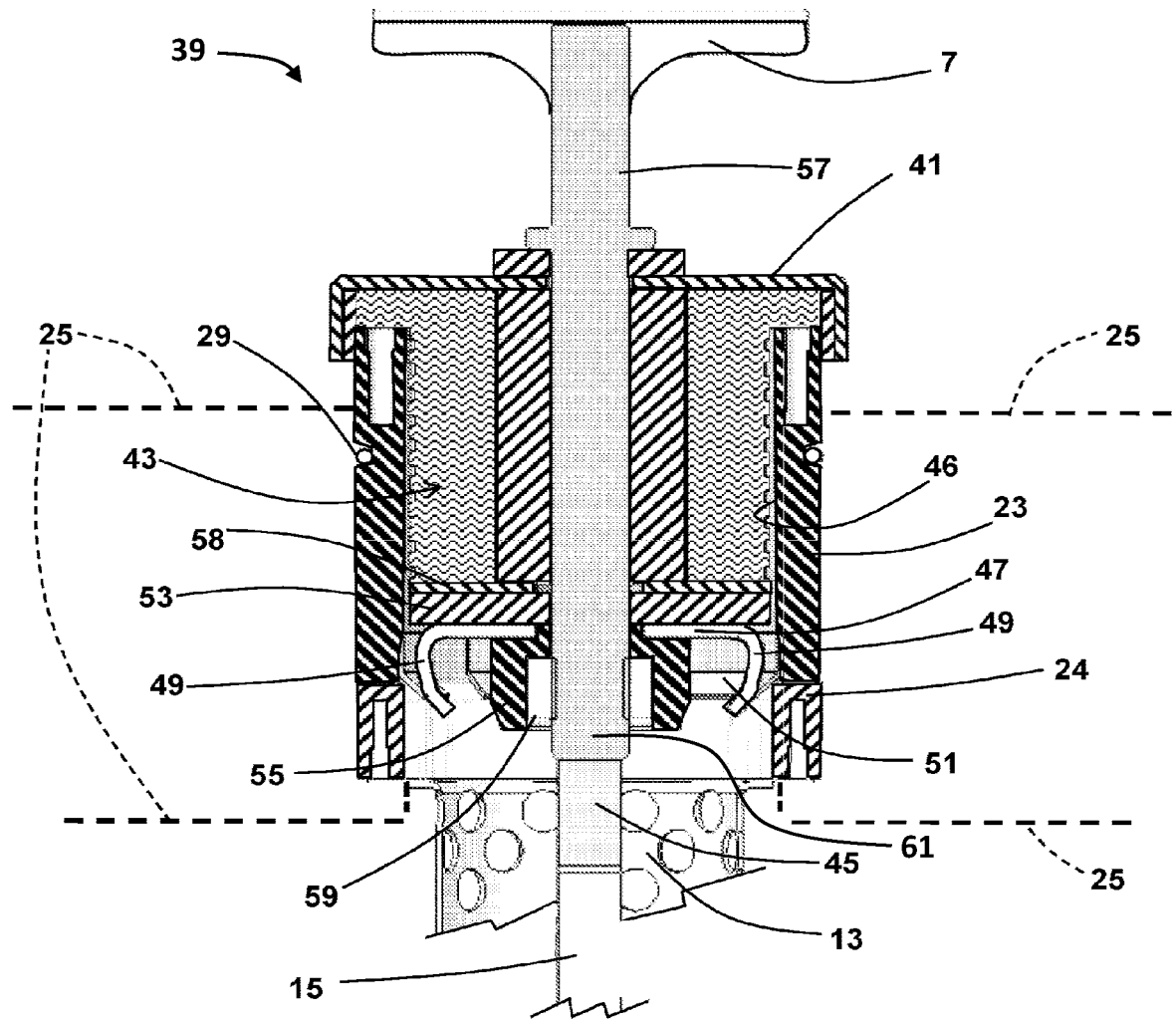
FIG. 5 is a cross-sectional view through the axial centerline of the dipstick structure of FIGS. 2 to 4.

Referring to FIG. 3, in the embodiment shown, the dipstick sensor device is configured to be mounted by inserting a two-part cylindrical structure generally indicated at 22 into a machined pocket or a bore in and extending through the wall 25 of the exterior of the transmission housing (shown in phantom) where the conventional dipstick system would extend. As best seen in FIG. 5, the manual dipstick bore in wall 25, shown in phantom, normally has an outer cylindrical passage that narrows radially to provide an annular shelf with a narrower concentric cylindrical bore therein extending into and communicating with the interior space of the housing 25 The installation may be an original installation or a retro-fit in which the electrical level-sensing system is installed in a transmission block 1 in which only the standard mechanical user-viewed clingage assessment of fluid level is provided. In a retro-fit process, the original mechanical system dipstick structure is removed to leave the bore, and the housings 23 and 24 are inserted therein.

The two-part cylindrical structure 22 includes upper cylindrical housing 23 and lower cylindrical housing 24. These structures 22 and 23 are configured to be received snugly in the bore in the transmission housing wall 25.

The lower cylindrical housing 24 is sized to fit in and be secured fixedly in the upper wider part of the bore or passage through the transmission housing wall 25 of the crankcase or transmission housing, resting on the annular shoulder of the dipstick bore. Lower housing 24 has electrical contacts connected to wires that extend inside the crankcase or transmission housing to the electrical harness and control electronics circuitry of the vehicle. Those may need to be installed in the transmission housing wall 25 in the case of a manual dipstick retrofit process. For example, a hole or passage may be drilled in the housing through which wiring from the dipstick sensor system extends, and sealing the passage so that fluid in the reservoir cannot escape therethrough and so that contaminants cannot enter the reservoir from the outside.

The upper cylindrical housing 23 fits into the upper wider bore or passage in transmission housing wall 25 and is secured in it by a screw 27 and washer on a bracket 28 on the side of the upper cylindrical housing 23 that releasably screws into a threaded bore (not shown) in the outer surface of transmission housing wall 25 of the crankcase or transmission housing. An O-ring 29 mounted in a groove in the upper cylindrical housing 23 seals any gap in the bore in the transmission housing wall 25 around the cylindrical housing 23 to keep contaminants out.

Figure 4:
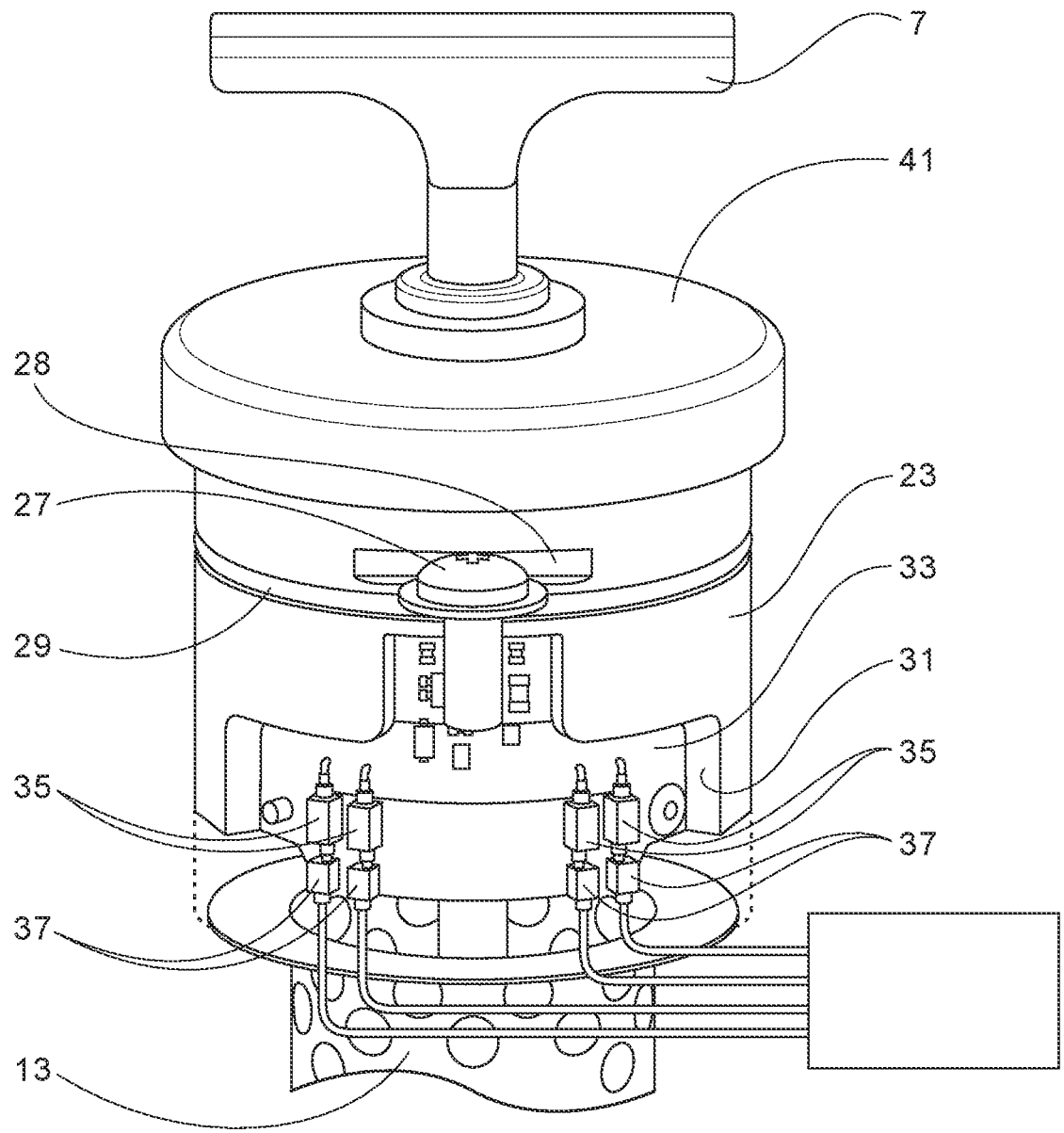
FIG. 4 is a detail perspective view of the outer end housings of the dipstick structure of FIG. 3.

The parts of the dipstick assembly are configured so that relatively low-cost, high-reliability components are mounted to the lower housing 24 and then connected to the wiring harness of the engine or transmission. As best seen in FIG. 4, the outer surface of the upper cylindrical housing 23 has a recess 31 therein that supports a circuit board structure 33 fixedly secured to the cylindrical housing 23 in the recess 31. In the embodiment shown, the circuit board 33 has four electrical spring contacts 35 that each mate with and connect electrically to a corresponding electrical contact of a set of four plate or tongue contacts 37 supported on lower cylindrical housing 24 in the bore of the wall 25, and those contacts 35 connect to wires leading from the dipstick sensor structure to electrical circuitry. The circuit board 33 and spring contacts 35 are more likely to fail over time than the contacts 37 and wires of the lower housing 24, and the circuit board 33 and spring contacts 35 therefore are mounted to the upper housing 23. The upper housing 23 is accessible from outside the engine or transmission exterior, and can be easily removed and repaired without interrupting the main wire harness.

Referring again to FIG. 3, the dipstick structure 39 comprises a handle 7 extending from a cap 41 that is configured to fit over the outside upper end of the upper housing 23. The structure includes an elastomeric seal portion 43 and a Y-shaped support structure 45 that supports at its lower end the coated metal ribbon-shaped dipstick 15. The seal portion 43 is cylindrical and sized to fit into an internal cylindrical passage 46 extending through the upper and lower housings 23 and 24.

Referring to FIGS. 4 and 5, when the dipstick is closed, the cap 41 overlies and covers the open top end of the upper housing 23.

Figure 6:
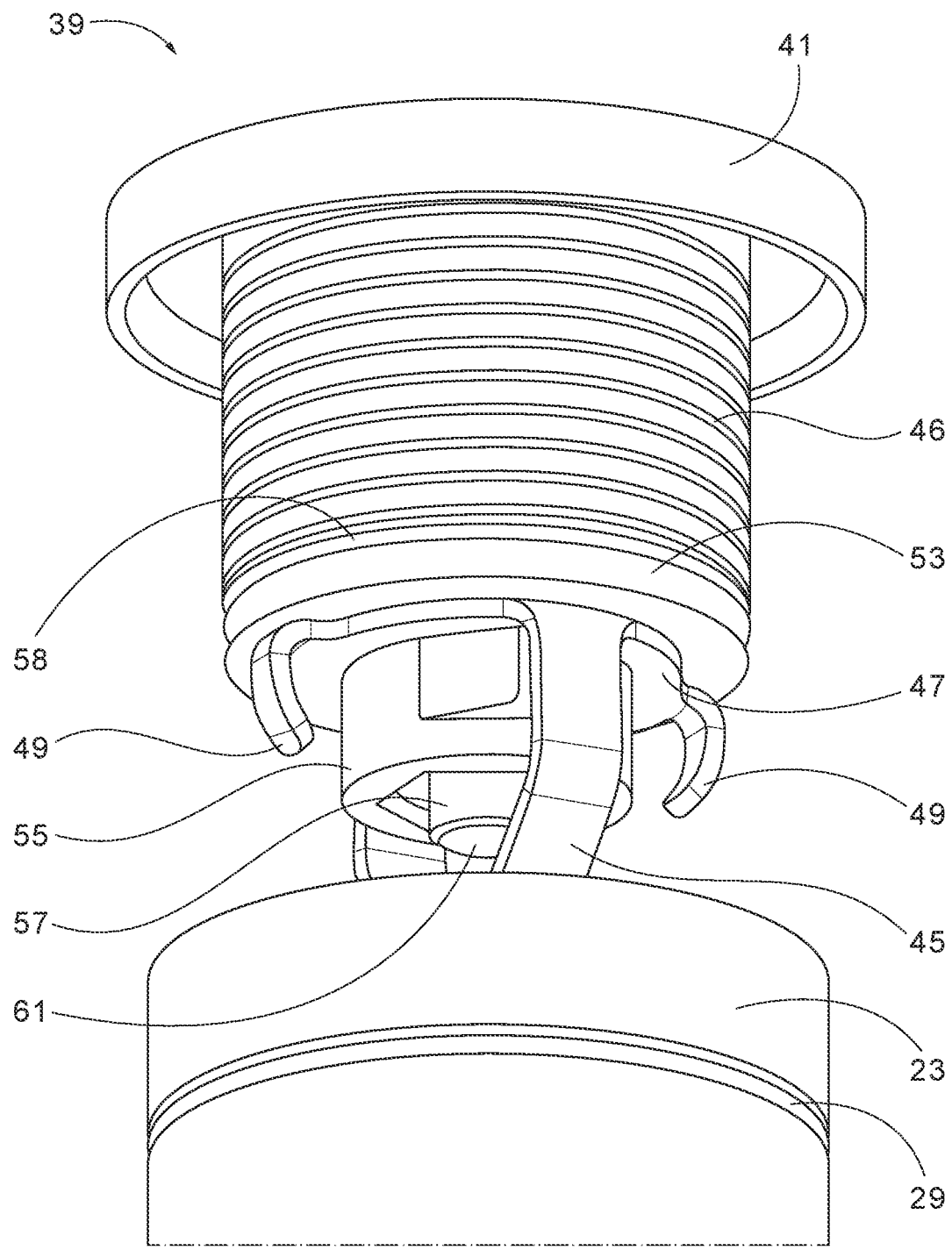
FIG. 6 is an upward perspective view of the dipstick connection of the dipstick of FIGS. 2 to 5.

The internal structure and operation of the dipstick structure 39 is best seen in FIGS. 5 and 6.

The dipstick 15 is connected mechanically and electrically to metallic Y-shaped support structure 45, which includes a collar plate 47. Collar plate 47 has downwardly extending contact arms 49 that engage and electrically connect with generally conical contact 51 secured in the interior passage of upper cylindrical housing 23. Conical contact 51 is electrically connected with the circuit board 33. This arrangement electrically links the dipstick 15 to the circuitry 33.

The structure also mechanically supports the dipstick insulated from electrical contact between the dipstick and any other part of the engine. The non-conductive coating 21 insulates the ribbon-shaped metal interior part 19 from contact with the guide housing tube 13. The Y-shaped support structure 45 is held spaced from the surrounding structure so as to avoid electrical contact. Collar plate 47 is held between washer 53 and inner collar support element 55 that extends through a central hole in the collar plate 47.

The cap 41 and the outer dipstick structure is secured in place by inserting the dipstick 15 into the tube 11 and 13 through the passage 46 in the cylindrical housings 23 and 24 until cap 41 is seated over the upper housing 23. Handle 7 is then rotated so as to screw down the structure and seal the assembly. This is accomplished as best seen in FIG. 5.

Handle 7 is fixed to a central shaft 57 that extends centrally through the sealer 43, through a metallic or rigid washer 58 and insulator washer 53, and is threaded to screw into a nut 59 embedded in collar support element 55. The lower end 61 of shaft 57 is spaced from the surrounding Y-shaped support structure.

Sealing is accomplished by tightening the handle 7 by turning it, which screws shaft 57 into the nut 59. That compresses the collar support element against the washers 53 and 58, which squeezes the elastomeric sealer 43 vertically. The sealer 43 is configured such that this squeezing causes it to bulge radially outward, sealing the handle structure against the cylindrical inner surface of passage 46 in upper housing 23. This structural arrangement ensures that the handle 7 that tightens the seal between the upper housing 23 and the dipstick seal 43 is insulated to prevent anyone touching the handle interfering with an accurate reading.

Figure 7:
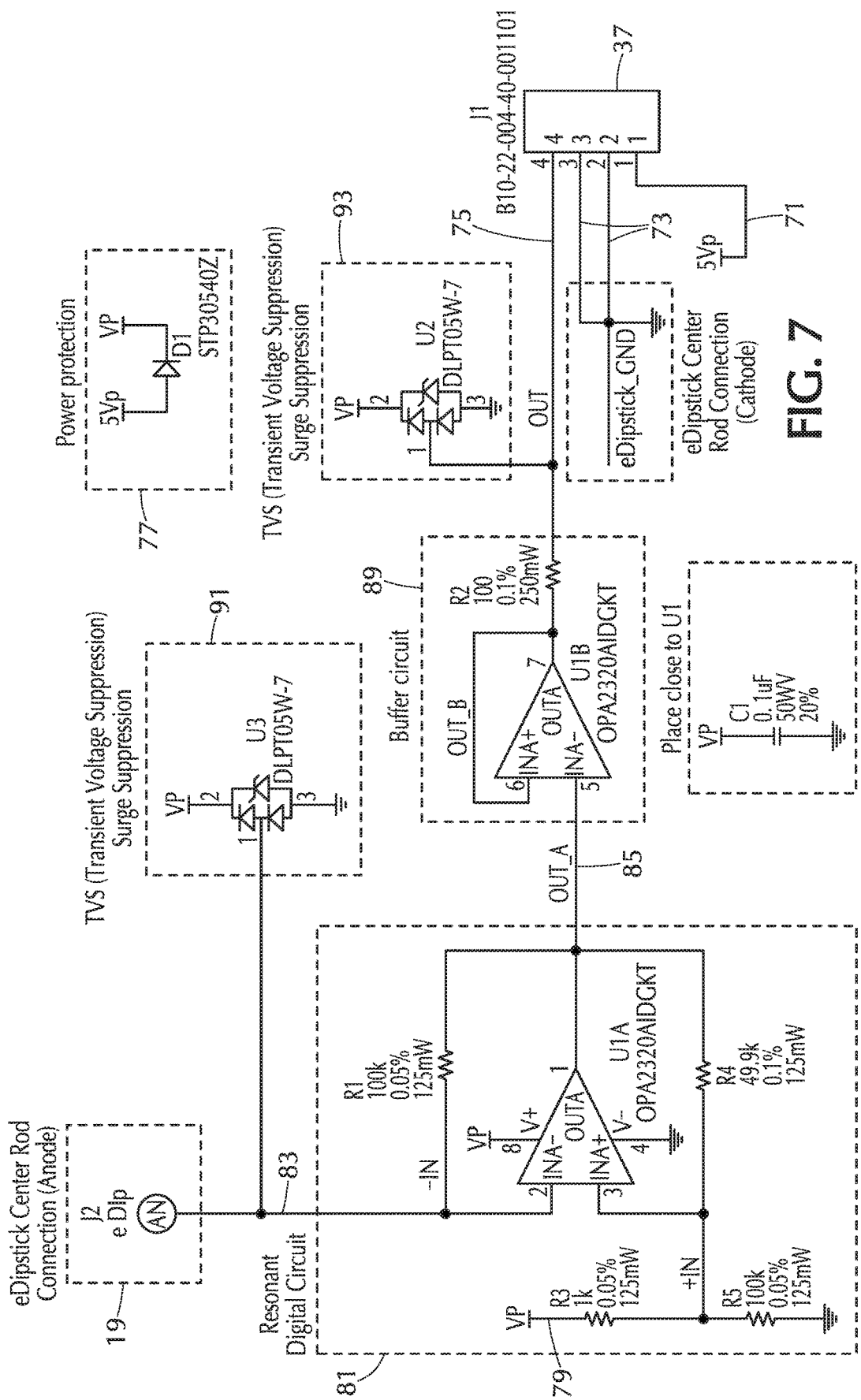
FIG. 7 is a schematic of a circuit that interrogates the dipstick to determine the depth of fluid in the reservoir of the crankcase.

The diagram of FIG. 7 illustrates the circuitry of the circuit board 33 that senses the level of fluid or oil that is surrounding the dipstick in the guide housing tube 13.

Four electrical contacts 35 connect with the circuitry of board 33. One line 71 receives a 5 volt DC current to power the sensor system. Two contacts 35 provide two lines 73 that act as a ground "eDipstick_GND" which serves as the cathode for the electrical circuit. The fourth contact connects to a line 75 that carries the output signal from the sensor system.

The 5-volt input voltage is passed through a power protection diode circuit 77 that prevents spikes or surges from damaging circuit 33. The resulting current (VP) is transmitted to line 79 of resonant digital circuit 81. Resonant digital circuit 81 has a line 83 connecting electrically to the metal center rod or ribbon 19 of the dipstick 15, accomplished by rivets through the wall of the upper housing 23 that connect electrically to contact element 51, arms 59, and via Y-shaped structure 45 to the dipstick core 19.

The operation of the resonant digital circuit is fairly simple. It applies 5 volts of DC current to the dipstick core 19 until it has charged the dipstick 19 as a capacitor plate in a capacitor defined as the dipstick core 19 and the surrounding engine, especially the guide housing tube 13. As soon as the capacitor is charged, the voltage is cut and the dipstick core 19 discharges the charge back through line 83. As soon as the charge of the insulated disptick is discharged, the circuit again applies the voltage to the dipstick until it is charged again.

This charging and discharging process is repeated continuously, and the resulting electrical output is a series of square waves that have a frequency that is dependent on the capacitance between the dipstick core and the surrounding insulated engine, which varies as the level of liquid or oil in the engine housing changes up or down. That square-wave electrical signal is transmitted via output line 85 to a buffer circuit 89 that acts to decouple the capacitive dipstick from the output, which is then output via line 75 to contact 37. Contact 37 is connected with a respective contact 35, which carries the square-wave output signal to the digital circuitry supporting the engine, which determines from the frequency a level of fluid in the engine. The digital circuitry includes a user-visible display device, such as an LCD or CRT screen, and audible alarm systems. If the level of fluid is below a predetermined threshold, a warning is displayed to the user of the vehicle, and a variety of actions may be taken by the controlling digital system based on the indicated level of fluid in the engine. The circuit board 33 processes the signal from the dipstick and ground and returns a signal with a frequency output that can be later converted by software to display the liquid level and/or create an alert if necessary. The circuit board will be potted to enhance reliability after mounted to the upper assembly.

The circuitry 33 is also protected by connection therein to transient voltage suppression circuit elements 91 and 93 that absorb sudden spikes in the signal from the dipstick.

The system of the invention is generally a standardized configuration, so calibration of the capacitance detected to the fluid level should not be required. However, against the possibility of varying capacitances of different individual systems, the system may be calibrated to set the threshold levels of capacitance corresponding to levels of the fluid in the crankcase sump 3.

Figure 9:
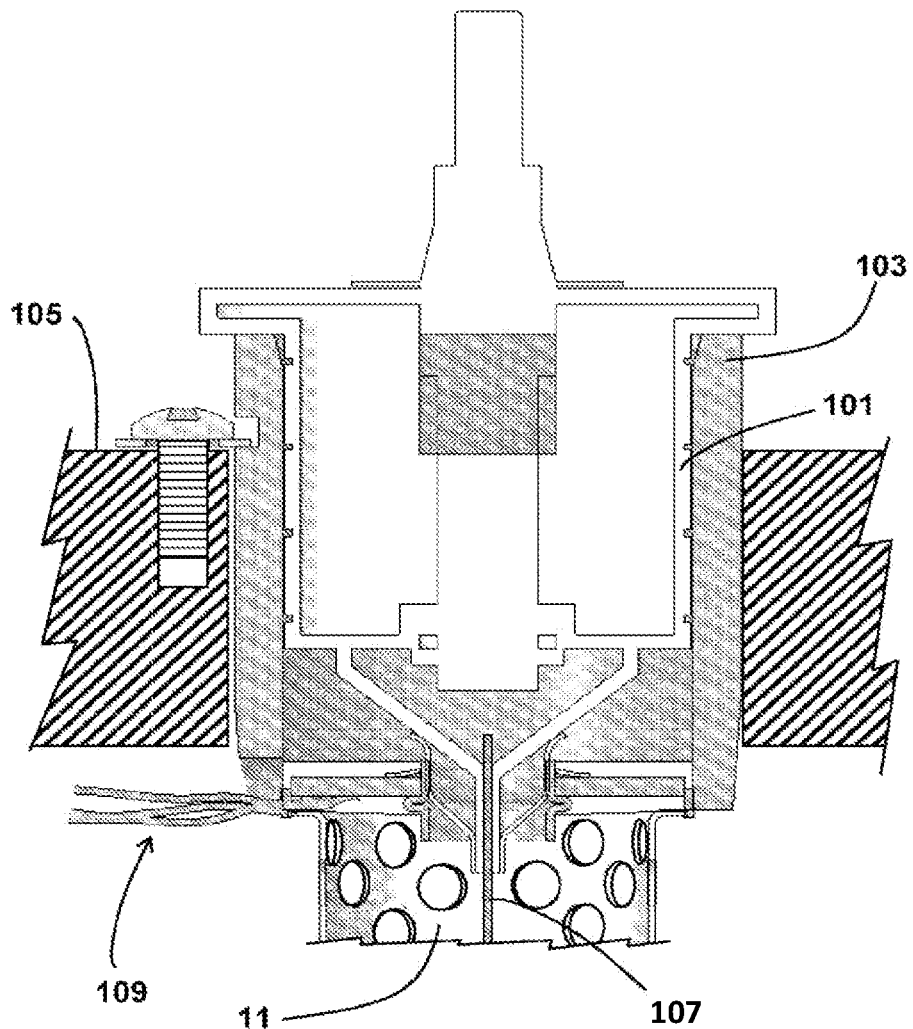
FIG. 9 is a cross-sectional view through the axial centerline of an alternate embodiment of dipstick according to the invention.

Referring to FIG. 9, an alternate embodiment is shown that functions similarly to the above embodiment, but employs a plug structure 101 that mechanically or screwingly is secured in a single housing 103 secured in the wall 105 of the engine. Wires 109 connect electrically to the dipstick 107, and sensing of the level of fluid may be done by a circuit remote from the dipstick assembly.

Figure 10:
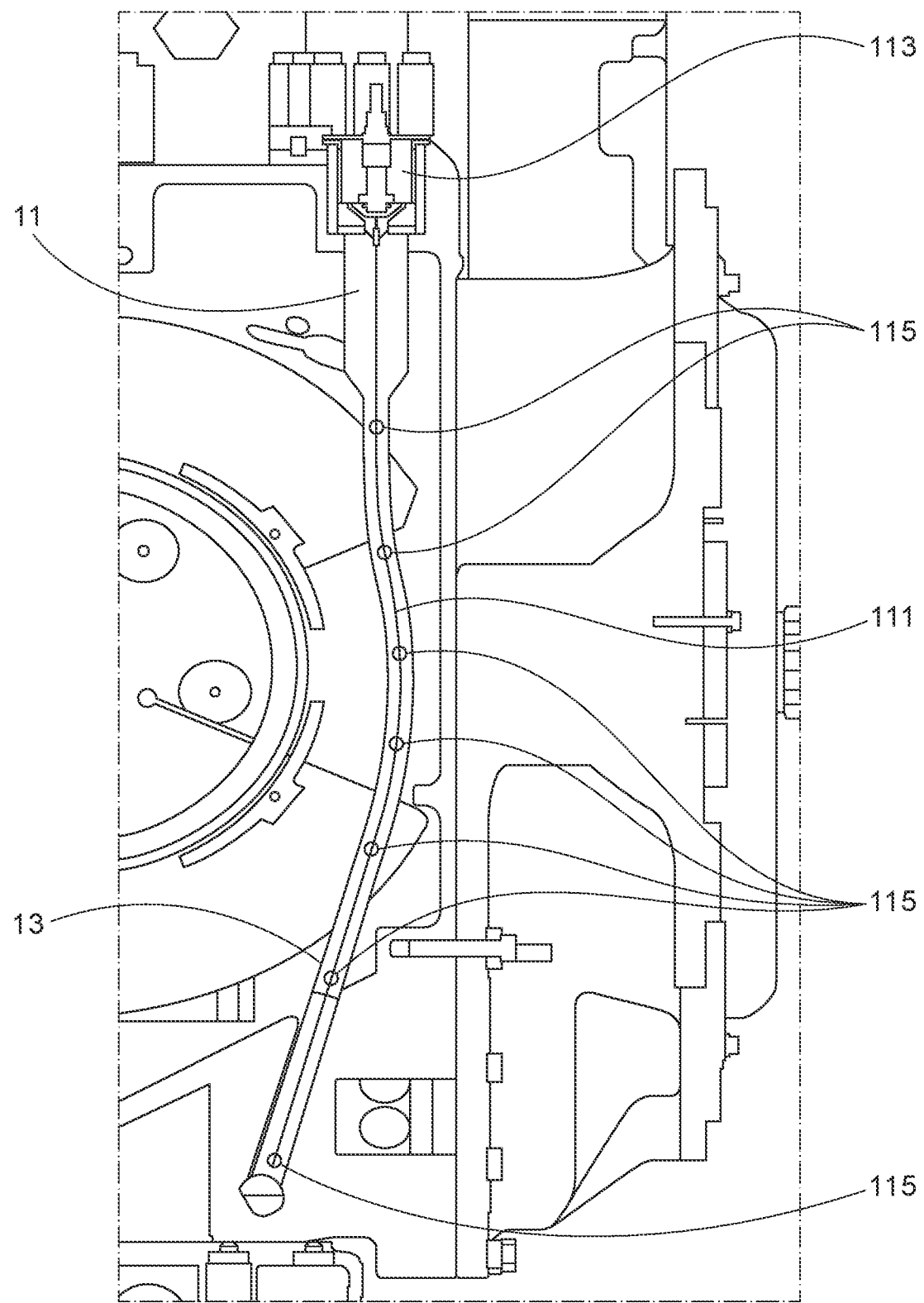
FIG. 10 is a view of the interior of a transmission with an alternate embodiment of dipstick of the invention.

Still another embodiment of a dipstick according to the invention is illustrated in FIG. 10. The dipstick 111 shown is a metal, usually steel, ribbon or cable supported on the handle structure 113, similar to the previous embodiments. The dipstick 111, instead of being insulated by a coating or complete overmold of polymer insulator, is insulated by an overmold that consists of a series of spaced beads 115 on its surface and over its length that keep the dipstick electrically isolated from the surrounding guide housing tube 13 by preventing actually physical contact between the dipstick 111 and the guide housing tube 13. Electrical operation and circuitry of the system is the same as or similar to the previous embodiments.

An embodiment of dipstick sensing system for use in a reservoir, such as the engine block crankcase of FIG. 1 or 10, is shown in FIGS. 11 to 18.

FIG. 11 shows the overall structure of the dipstick system 121. The system has a cylindrical housing 123 that is installed in a cylindrical bore in the reservoir or crankcase of the engine block. A handle 125 of the dipstick projects upwardly from a top cap 126 of the system and outward from the reservoir. The dipstick 127 itself extends downward from the handle 125 thorough the housing 123 and into the interior of the reservoir. Cable 128 carries wires that power the fluid level sensing circuitry and carry an output signal from the circuitry connected with the dipstick. This cable 128 connects with the circuitry in the housing 123 from the inside of the reservoir, and extends through the reservoir to an exit aperture through which it can connect with other electronic circuitry of the reservoir or vehicle to provide the signal for electronic monitoring of the fluid level, and for providing an alarm, visible, audible or electrical, when the fluid is lower than a predetermined threshold level.

Perforated upper tube 129 is affixed to the bottom of housing 123, and lower tube 131 supported on upper tube 129 and extends downwardly from the lower narrowed end of upper tube 129. The dipstick 127 extends through the upper and lower tubes 129 and 131 into the reservoir beyond the lower end 130 of lower guide tube 131. The fluid or oil in the reservoir is free to flow along the dipstick 127 inside tube 131.

Referring to FIGS. 12 and 13, bolt structure 133 secures the system 121 to the outer surface of the reservoir housing 137 by bolt 135 which is threadingly secured in a bore in the reservoir housing.

FIG. 13 shows the interior structure of the dipstick system 121. Cylindrical housing 123 is made up of two separate parts, a lower housing 139 and an upper housing 141. The two housings 139 and 141 are both dimensioned to fit snugly in the installation bore 143 of the reservoir wall 137. This bore 143 may be specifically provided in a newly manufactured reservoir or engine block so that it is dimensioned to receive the dipstick sensing system 121, or the bore 143 may be a bore dimensioned for use with an earlier design of dipstick system, in which case the dipstick outer housing 123 is dimensioned for installation in the pre-existing bore 137. Alternatively, a new bore may also be machined out of the reservoir wall 137 to receive the system 121. An O-ring seal 138 in an annular groove in the upper housing 141 is provided to protect the interior of the reservoir 137 against infiltration of dirt or contaminants passing between the housing 123 and the bore 143.

Handle 125 is connected to a central rod or shaft 145 that extends through cap 126 and through the housings 139 and 141. The shaft 145 extends through an elastomeric sealing member 147 that is generally cylindrical in shape and sealingly contacts inner cylindrical wall 149 of upper housing 141. Lower end 146 of shaft 145 is threaded into holding nut 151, which is embedded in an overmolded isolator body 152. Isolator body 152 is of electrically insulating material, preferably plastic, that is resistant to exposure to fluid or oil at high temperatures, such as are encountered in engine crankcases. Particularly preferred for the material of the overmold is VICTREX PEEK (polyaryletheretherketone) material, such as that sold under the designation 450G, 450GL30 or 450CA30 by Victrex PLC of Lancashire, U.K. The isolator body 152 maintains the shaft 145 and the handle 125 electrically insulated from the dipstick 127, so that someone touching the handle 125 does not affect the electronic sensing of the level of fluid in the reservoir.

Isolation body 152 engages and supports dipstick connection structure 153 and washer 155, which engages a lower surface of sealing member 147, holding sealing member 147 between the dipstick connection structure and the cap 126. Sealing member 147 is formed of deformable elastomeric insulating material, particularly preferred being fluorosilicone material.

When not in manual use, the user turns handle 125 clockwise (the direction indicated "TIGHTEN" on cap 126 in FIG. 12) to seal the dipstick in the housing 123. Turning the handle 125 in that direction screws shaft 145 downward into nut 151 in isolation body 152, which vertically compresses sealing member 147, which deforms to bulge radially outward and sealingly press against the inner bore 149 of upper housing 141. In this tightened or sealed condition, a force of 20 pounds applied to the handle is not enough to withdraw the dipstick assembly from the housing 123.

When the user wishes to withdraw the dipstick, to manually visually check the level of the fluid, or to simply supply more fluid into the reservoir through the opening, the user turns handle 125 counter-clockwise. This unscrews the lower end 146 of shaft 145 upwardly through nut 151, which allows the resilient sealing member 147 to expand upward and retract radially inwardly away from the bore wall 149. This allows the user to easily withdraw the dipstick assembly from the housing 123.

The isolation body 152 supports metallic dipstick connection structure 153, preferably of stainless steel. The dipstick connection structure 153 has a central body with an aperture through which the isolation body 152 extends, keeping it electrically apart from shaft 145. The connection structure 153 includes a Y-shaped pair of legs 157 that extend downwardly and inwardly to connect to and support the metallic dipstick member 159. The connection structure 153 also has contact extensions or wings 161 that extend outwardly and electrically connect with generally annular conical metallic contact 163 in the lower portion of upper housing part 141. This provides an electrical connection to the dipstick 159 for fluid-level sensing circuitry in the upper housing 141 operating similarly to the circuitry of FIG. 7 to detect capacitance of the dipstick and output a square wave with a frequency corresponding to the depth of fluid into which the dipstick projects.

Figure 14:
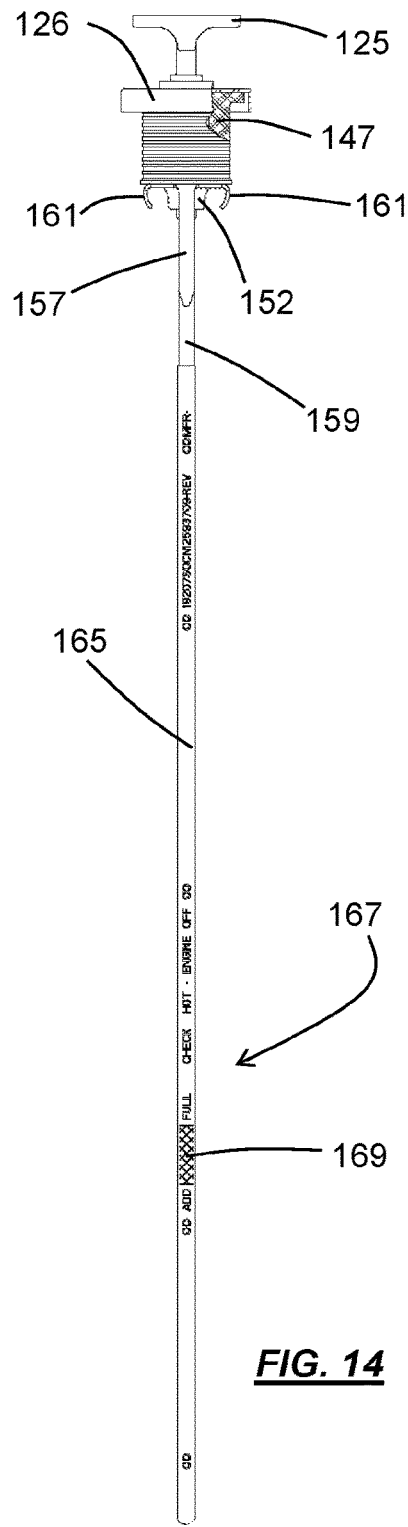
FIG. 14 is an elevational view of the dipstick in the system of FIGS. 11 to 13.
Figure 15:
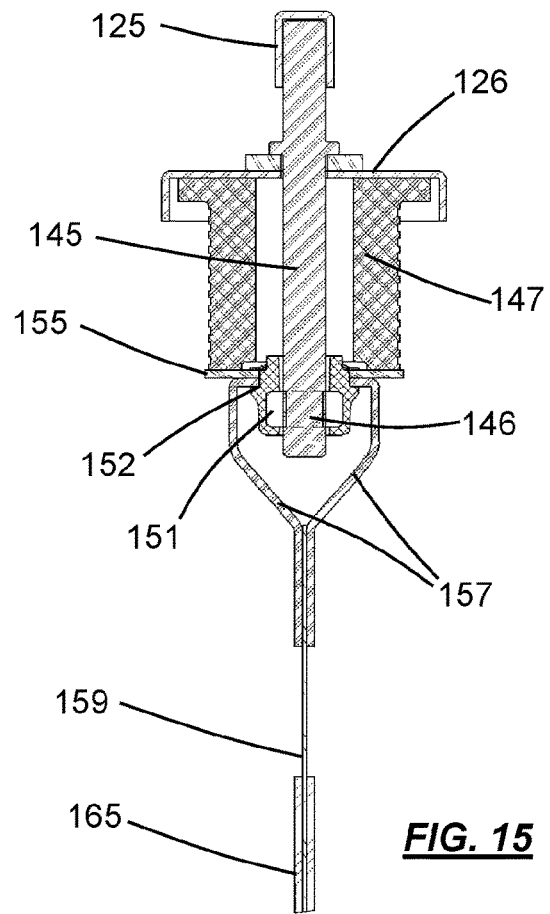
FIG. 15 is a detail cross-sectional view through line B-B of FIG. 14.
Figure 16:
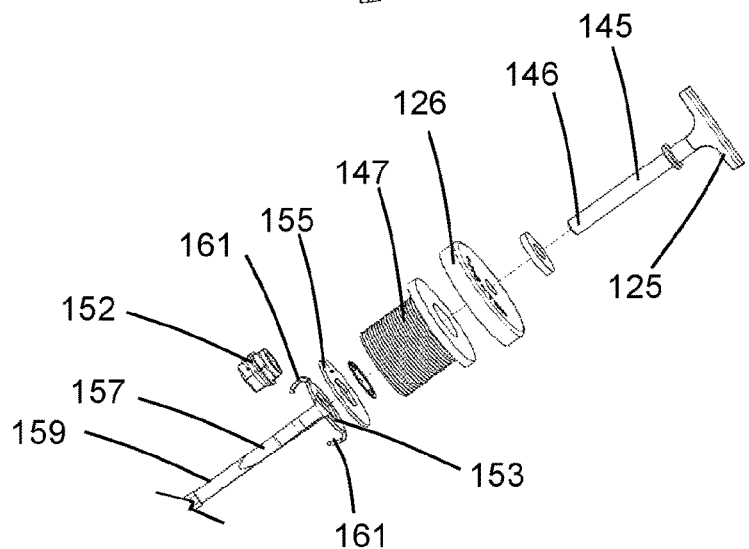
FIG. 16 is an exploded perspective view of the upper end of the dipstick of FIG. 14.

FIGS. 14, 15 and 16 show the dipstick unit removed from the housing 123. The handle 125, cap 126, and sealing member 147 all remain together as the dipstick is withdrawn from the reservoir for viewing of clingage to determine the level of the fluid. The length of the dipstick member 159 is coated or covered with an overmold of insulating material that ensures that there is a capacitive spacing between the metal dipstick member 159 and the surrounding metallic parts of the reservoir or engine crankcase. This outer layer 165 is as shown in FIG. 2A, and extends down and completely covers the lower end of the dipstick member 159. The insulating material is electrically insulating and also durable enough to survive in the environment of heated oil or other fluid, such as the oil in a crankcase of an operating internal combustion engine. The VICTREX PEEK material identified above is also particularly desirable to use in this overmold 165.

The dipstick 159 with its coating of insulation 165 has an outer surface to which the fluid or oil in the reservoir clings, and when the dipstick is withdrawn, it is possible to see the level of fluid from the locations to which there is clingage on the dipstick. To aid in visually assessing the fluid level, the outer coating has symbols generally indicated at 167 indicating the level of the fluid, and whether adequate fluid is present or needs to be added, as is well known in the art. The symbols or writing and markings may be printed or more preferably are raised surface lettering and marks. In addition, as is well known in the art, the dipstick may be provided with a roughened or patterned portion 169 that improves clingage in that area so that the clingage is clearly visible to the user.

FIG. 16 shows an exploded view of the dipstick assembly of FIGS. 14 and 15. The entire assembly is held together by the threaded nut 151 (FIG. 13) in isolation body 152 screwed on to the threaded lower end 146 of shaft 145 attached to handle 125.

Figure 18:
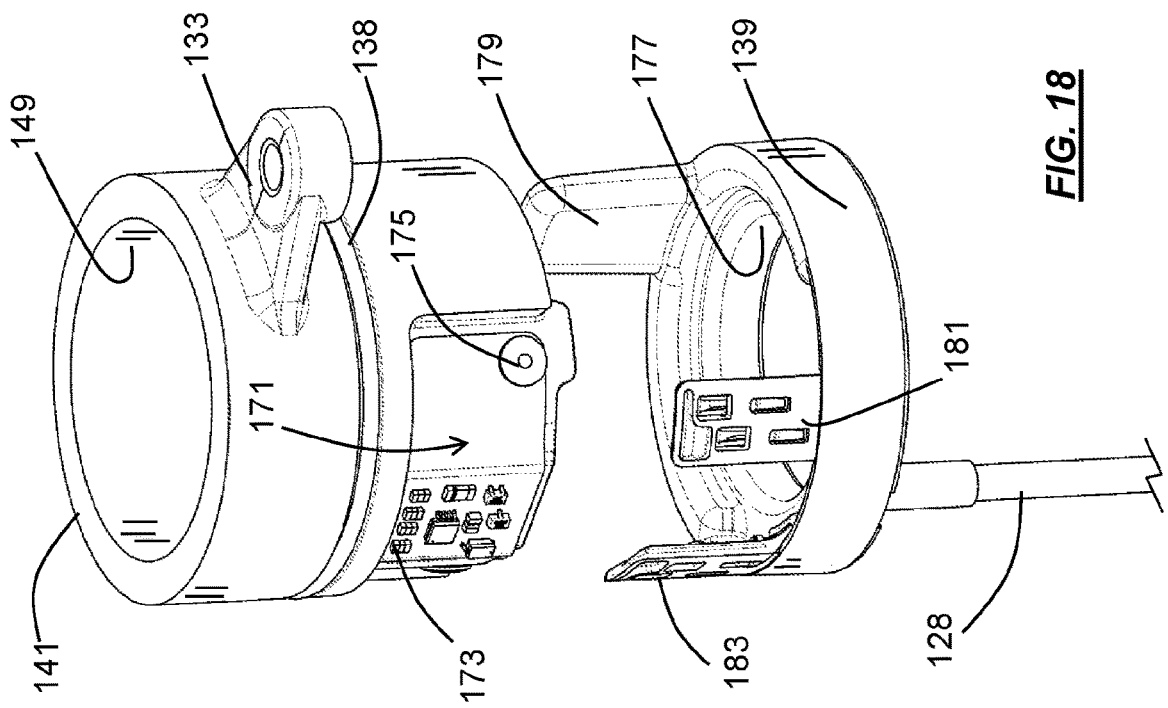
FIG. 18 is a perspective view of the housing of FIG. 17 with the upper and lower parts separated.
Figure 17:
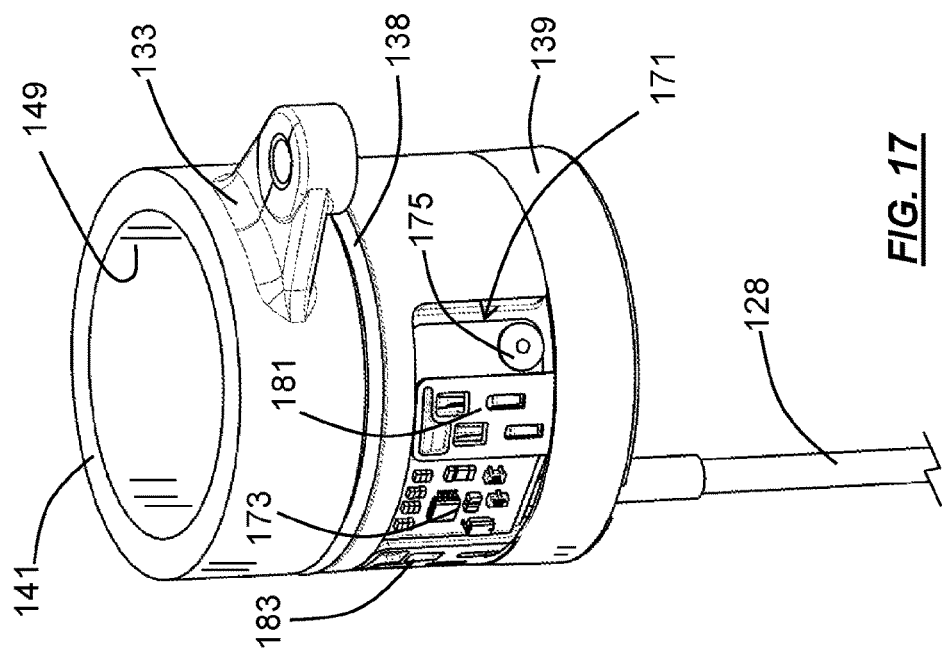
FIG. 17 is a perspective view of the outer housing structure of the system of FIGS. 11 to 13.

FIGS. 17 and 18 show the structure of the housing 123. Housing 123 comprises an upper housing and a lower housing 141 and 139, both of which are secured in a cylindrical bore in the wall of the reservoir or engine block.

Upper housing 141 supports a bracket 133 that bolts on to the outer surface of the reservoir or block (not shown). It has a cylindrical inner bore or passage 149 that sealingly receives the resilient sealing member of the dipstick assembly, as described above. Upper housing also has a radially outwardly disposed recess indicated at 171 that supports therein circuitry such as that of FIG. 7 that interrogates or senses electronically the level of fluid in the reservoir from an electrical characteristic of the dipstick when secured in the system, specifically capacitance of the dipstick relative to the surrounding reservoir or engine block or crankcase. This circuitry is preferably in the form of a board 173 that is secured to the outward facing recessed surface of the recess 171 by a fastening structure, such as rivet 175. Board 173 is connected electrically to the annular contact 163 (see FIG. 13) in lower end of the inner bore 149, which connects the board 173 to the dipstick metal member 159.

Upper housing is provided with the board 173 because the board is potentially vulnerable and may need replacement, which can be accomplished easily by removing the bolt through bracket 133 and swapping out the entire upper housing 141 or by repairing the board 173 accessible when the upper housing is removed from the reservoir or engine wall.

Lower housing 139 is of the same diameter as the upper housing 141, and fits snugly thereagainst when they are installed together, as seen in FIG. 17. The lower housing also has an inner passage 177 through which the dipstick assembly extends into the reservoir or crankcase. Extending up from lower housing 139 is guide protrusion 179, which glidingly fits into a recess in the bottom of upper housing 141 to ensure alignment of the housings 139 and 141 properly when the two housings are placed in the bore of the reservoir.

Alignment is important because the lower housing 139 also has contact boards 181 and 183 extending upwardly. These contact boards 181 and 183 each has two contacts to respective wires in the cable 128. The contact boards 181 and 183 are configured so that when the lower housing meets the upper housing 141 correctly, electrical contact is made between the wires of the cable 128 and the board 173, as is well known in the art of plug-in PC boards. The four wires generally carry DC power for the board 173, provide one or two ground lines, either real ground or local ground, which are used to determine capacitance of the dipstick, and an output line carrying the square wave generated by the capacitance detection circuit used to determine the fluid level, as has been described. The cable 128 usually runs through the reservoir or crankcase to connect to electronics that process that output signal to provide alerts to the user when the fluid level is below a predetermined threshold level.

Particularly in a vehicle, there is an extensive electrical harness with indicator lights and displays, and a "low oil" warning light or display can be triggered when a comparison of the sensed level of the oil to one or more predetermined values for levels of the oil indicate that the oil or fluid is low. An audible alarm may also be triggered at the same time, or as an alternative.

In addition, especially where the reservoir is a vehicle engine crankcase, the vehicle may be moved into different orientations at which the detected level of oil may fluctuate without any change in the real amount of oil in the crankcase. That can impact on the reliability of the signal from the dipstick for determining the actual fluid level in the crankcase. To account for this possibility, the vehicle electronics can also electrically detect, using sensors well known in the art, the angle of sloping of the vehicle and its engine, and based on that detected orientation, alter what would otherwise be the reaction to the electrically detected level of fluid. For example, if a high angle of tilt is detected and the level of fluid detected is low, the system may disregard the level detected and not generate an alarm until the vehicle is closer to level. Alternatively, dependent on the angle and direction of tilt of the orientation, the system may adjust the detected value of the level of the fluid to compensate for the tilt before generating an alert to the user.

The embodiment shown is suitable for either installation is a new engine or for retrofit of an existing engine that has only a manual dipstick fluid monitoring system, to provide it with an electrical level sensing system as well.

The dipstick systems shown herein provide for:
Novel use of method for remotely checking a fluid level;
Use of the dipstick as part of the capacitive circuit;
Use of the capacitive circuit for varying frequency output;
Novel design of apparatus for remotely checking a fluid level; and
A new method of providing electronic level sensing for a housing with a conventional dipstick.

The operational principle of the new "dual purpose" dipstick is in part internal capacitance. The level of fluid (oil, for example, but not limited to oil) is sensed by using an outer and inner tube and measuring the electrical capacitance between them as the dielectric (air vs. fluid), which changes with varying fluid level. The measured capacitance is converted into a frequency output, which is used to inform the user (i.e., vehicle driver) of the fluid (transmission oil) level.

In the case of a HMPT hydromechanical tank transmission, due to variations in oil level from vehicle attitude, monitoring oil level is only possible on level ground. The system includes other sensors and instrumentation that detects orientation of the vehicle and determines adjustments for fore-aft and side-side changes in the orientation of the vehicle that would affect the detected level of fluid in the housing.

An embodiment of the electronic dipstick uses a modification of the existing guide tube and dipstick, with the addition of a circuit board, to perform the electrical detection functions as previous versions. The advantages gained by doing this include:

The parts of the new dipstick system fit within the envelope of the pre-existing dipstick;

The new dipstick can be used to manually check the oil level (if desired);

Electrical mating or connection of the sensor to the electronic vehicle display takes place when the dipstick is inserted into the guide tube, so there are no connectors or wires laying loose on the transmission;

Electronic failures have a redundant function, in that the isolated dipstick may also be used as a traditional manual dipstick.

Electrical insulation of the dipstick from the guide tube is accomplished by adding plastic overmold along the length of the dipstick. Alternatively, beads can prevent electrical contact between the two parts. At the top of the dipstick, the mounting tube that normally provides a sealing surface for the dipstick is currently made from aluminum. The mounting tube in one system of the invention is replaced by a high-temperature plastic version to further insulate the dipstick.

Electrical contact is made by two spring wipers that are welded to the dipstick that make contact with the inside diameter of the circuit board when the dipstick is secured in the receiving opening of the housing. The circuit board makes contact with the dipstick guide tube through contacts on the lower side of the board that are positioned so as to make contact with the guide.

The overall height of the electrically insulated dipstick is identical to the pre-existing manual dipstick. This means that if an electronic version dipstick is not available for any reason, an earlier, non-electrical dipstick can still be inserted in place of the insulated dipstick of the invention, allowing for manually checking the fluid level.

Additionally, if the insulated dipstick of an electronic level-sensing system of the invention is used in a transmission that has not yet had the contacts etc. of the electronic version installed, manual checking of the level is still available without damage to any components.

It may be understood that while the present specification describes the reservoir of the invention in the general context of the block or crankcase of an engine containing a fluid that is oil or a mixture of oil with another fluid, the present invention may be applied to environments where a dipstick is used to assess the level of a liquid in a container, even liquids with a viscosity that makes them almost a gel, to enable assessment of the level of the liquid in the container by an electrical sensor circuit.

The terms herein should be viewed as terms of description rather than of limitation, as those of skill in the art with this disclosure before them will be able to make changes and modifications therein without departing from the spirit of the invention.

What is claimed is:

1. A fluid level sensing system comprising:
   a capacitive sensor pair including
      a dipstick having
         an electrically conductive dipstick portion disposed along at least a portion of a length of the dipstick, markings thereon configured to enable a user to visually determine a level of a fluid based on clingage of the fluid to a surface of the dipstick when the dipstick is removed from a body of the fluid, and
         an electrically nonconductive material disposed on at least a portion of the electrically conductive dipstick portion, and
      a dipstick support structure having an electrically conductive dipstick support structure portion disposed along at least a portion of the dipstick support structure and disposed parallel to and a non-zero distance from the electrically conductive dipstick portion; and
   an electrical system connected to the electrically conductive dipstick portion and the electrically conductive dipstick support structure portion, the electrical system configured to electrically sense an electrical characteristic of an electrical current flowing between the electrically conductive dipstick portion and the electrically conductive dipstick support structure portion, the electrical characteristic corresponding to a length of the capacitive sensor pair having the fluid between the non-zero distance of the electrically conductive dipstick portion and the electrically conductive dipstick support structure portion.

2. The fluid level sensing system of claim 1, further including a reservoir configured to hold the body of the fluid, wherein the reservoir is included in one of a lubrication fluid reservoir and the fluid is oil or a fluid containing oil.

3. The fluid level sensing system of claim 2, wherein the markings correspond to predetermined levels of fluid in the reservoir.

4. The fluid level sensing system of claim 1, wherein the electrically conductive dipstick portion comprises an electrically conductive inner member configured to be disposed below the level of the fluid, and
   wherein the electrically nonconductive material is configured to electrically insulate the electrically conductive inner member from the dipstick support structure portion.

5. The fluid level sensing system of claim 1, wherein electrical characteristic is correlated to a capacitance value relative to the length of the capacitive sensor pair having the fluid between the non-zero distance between the electrically conductive dipstick portion and the electrically conductive dipstick support structure portion.

6. The fluid level sensing system of claim 5, wherein the electrical system electrically applies the electrical current to the capacitive sensor pair until one of the dipstick and the dipstick support structure is fully charged, and then cuts supply of the electrical current to the corresponding one of the dipstick and the dipstick support structure to allow an electrical discharge and thereby produce, in the electrical current in the corresponding one of the dipstick and the dipstick support structure, an electrical output including a waveform with a frequency correlated, by the electrical system, to the level of fluid corresponding to the length of the capacitive sensor pair having the fluid between the non-zero distance between the electrically conductive dipstick portion and the electrically conductive dipstick support structure portion.

7. The fluid level sensing system of claim 6, wherein the electrical system further:

compares the frequency of the electrical output to a predetermined frequency value;
indicates, responsive to the comparison, that the fluid is below a predetermined level associated with the predetermined frequency value; and
outputs an alert, corresponding to the indication that the fluid level is below the predetermined level.

8. The fluid level sensing system of claim 6, wherein the electrical system further:
derives a value corresponding to the sensed level of the fluid from the frequency; and
outputs the value to the user so as to indicate the sensed level of the fluid.

9. The fluid level sensing system of claim 6, wherein the electrical output is an analog square wave with a variable frequency.

10. The fluid level sensing system of claim 2, wherein the reservoir further includes a wall with an opening therein communicating with an interior of the reservoir, and
wherein the dipstick support structure and the dipstick each has a respective electrical contact portion, the electrical contact portion of the dipstick being electrically connected with the electrically conductive dipstick portion, and the contact portions engaging each other when the dipstick is inserted into the dipstick support structure so as to electrically connect the electrical system with the electrical contact portion of the dipstick.

11. The fluid level sensing system of claim 10, wherein the dipstick support structure comprises a housing supported in the opening through which the dipstick extends; and
wherein the housing has an outer part and an inner part, the outer part supporting circuitry for the fluid level sensing system such that the circuitry may be replaced by replacing the outer part of the housing.

12. The fluid level sensing system of claim 11, wherein a cable connecting wiring supplying power to the circuitry extends through the interior of the reservoir and is connected with the inner part of the housing, the inner part of the housing having an electrical contact thereon that forms an electrical connection with an electrical contact of the circuitry in the outer part when the inner and outer parts of the housing are installed in the wall of the reservoir.

13. The fluid level sensing system of claim 2, wherein the reservoir is a vehicle engine and the system includes circuitry determining an orientation of the engine and evaluating the level of fluid sensed by the system based on the orientation.

14. A method of electrically sensing a level of fluid, the method comprising:
providing a capacitive sensor pair including
a dipstick having
an electrically conductive dipstick portion disposed along at least a portion of a length of the dipstick,
markings thereon configured to enable a user to visually determine a level of a fluid based on clingage of the fluid to a surface of the dipstick when the dipstick is removed from a body of the fluid, and
an electrically nonconductive material disposed on at least a portion of the electrically conductive dipstick portion, and
a dipstick support structure having an electrically conductive dipstick support structure disposed along at least a portion of the dipstick support structure and disposed parallel to and a non-zero distance from the electrically conductive dipstick portion;
producing an electrical output indicative of an electrically determined level of the fluid, the electrical output being derived electrically from an electrical characteristic of an electrical current flowing between the electrically conductive dipstick portion and the electrically conductive dipstick support structure portion, the electrical characteristic corresponding to a length of the capacitive sensor pair having the fluid between the non-zero distance of the electrically conductive dipstick portion and the electrically conductive dipstick support structure portion;
performing a comparison of the electrically determined level of the fluid indicated by the electrical output to a predetermined level; and
outputting an alert perceptible to the user based on the comparison indicating the electrically determined level of the fluid is below the predetermined level.

15. The method of claim 14, wherein the electrical characteristic of the electrical current corresponds to capacitance thereof relative to the length of the capacitive sensor pair having the fluid between the non-zero distance between the electrically conductive dipstick portion and the electrically conductive dipstick support structure portion, the method further comprising:
detecting the capacitance by repeatedly applying the electrical current to the electrically conductive dipstick portion until the dipstick is charged;
cutting the electrical current to the electrically conductive dipstick portion until the dipstick discharges; and
generating the electrical current having an output signal by repeatedly charging and discharging the electrically conductive dipstick portion, the output signal comprising a waveform with a frequency that correlates to the level of fluid between the non-zero distance of the electrically conductive dipstick portion and the electrically conductive dipstick support structure portion.

16. The method of claim 15, wherein the electrically conductive dipstick portion further comprises an electrically conductive inner member configured to be disposed below the level of the fluid, and
wherein the electrically nonconductive material is configured to electrically insulate the electrically conductive inner member from the dipstick support structure.

17. The method of claim 14, wherein the body of the fluid is configured to be disposed within a lubrication fluid reservoir, and the fluid is oil or a fluid containing oil.

18. The method of claim 17, wherein the providing of the capacitive sensor pair further includes retrofitting the engine having a non-electrified dipstick extending through an opening in a wall of a reservoir containing the body of the fluid, the non-electrified dipstick being configured to not electrically sense the level of the fluid,
wherein the retrofitting further includes removing the non-electrified dipstick and installing a housing in the opening in the wall, the housing supporting the dipstick, the housing being sealed in the opening.

19. The method of claim 18, wherein the housing has an outer part and an inner part both supported in the opening in the wall, the outer part incorporating therein electrical circuitry and the inner part having electrical contacts supplying power to the electrical circuitry and receiving therefrom the electrical output.

20. The method of claim 18, wherein the method further comprises:
detecting an orientation of the reservoir electronically; and based on the orientation detected, one of disregarding or adjusting the electrical output corresponding to the level of the fluid detected by the electrical circuitry.

21. A method of retrofitting a lubrication fluid reservoir configured to hold therein an oil-containing liquid, the method configured to enable electrically sensing a level of the oil-containing liquid in the lubrication fluid reservoir, the method comprising:

replacing a preexisting dipstick, in the lubrication fluid reservoir with
- a dipstick configured to be manually inserted into and removed from a reservoir in the lubrication fluid reservoir and further configured to enable a user to visually determine a level of the oil-containing fluid in the reservoir based on clingage of the oil-containing fluid to a surface of the dipstick having markings disposed thereon, the dipstick including
  - an electrically conductive dipstick portion disposed along at least a portion of a length of the dipstick and configured to at least partially extend into the oil-containing fluid and below the level of the oil-containing fluid, and
  - an electrically nonconductive material disposed on at least a portion of the electrically conductive dipstick portion;
- a dipstick support structure having an electrically conductive dipstick support structure disposed along at least a portion of the dipstick support structure and disposed parallel to and a non-zero distance from the electrically conductive dipstick portion, the dipstick support structure supporting the dipstick thereon so that the electrically conductive dipstick portion at least partially extends into the oil-containing fluid and below the level of the oil-containing fluid, and
- an electrical system connected to the electrically conductive dipstick portion and configured to electrically sense the level of the oil-containing fluid based on an electrical characteristic of an electrical current flowing through the electrically conductive dipstick portion corresponding to a length of the oil-containing fluid between the non-zero distance of the electrically conductive dipstick portion and the electrically conductive dipstick support structure portion,
- wherein the electrically nonconductive material is configured to electrically isolate the electrically conductive dipstick portion from the electrically conductive dipstick support structure when the dipstick is supported by the dipstick support structure,
- wherein the dipstick and the dipstick support structure form a capacitive sensor pair based on the non-zero distance of the electrically conductive dipstick portion and the electrically conductive dipstick support structure portion.

22. The method of claim 21, and further comprising:

forming an aperture in a wall of the lubrication fluid reservoir spaced from an opening of the preexisting dipstick;

extending a cable that carries an electrical signal that varies with the level of the oil-containing fluid in the lubrication fluid reservoir from an inner portion of the dipstick support structure through the aperture in the wall; and connecting the cable to electronics outside the lubrication fluid reservoir configured to receive the electrical signal and provide an indication of a level of the oil-containing fluid in the lubrication fluid reservoir.

* * * * *